United States Patent [19]
Herbert et al.

[11] Patent Number: 4,619,599
[45] Date of Patent: Oct. 28, 1986

[54] EXTRUSION HEAD

[75] Inventors: Adolf Herbert, Hanover; Klaus Bellmer, Ronnenberg; Jobst Trocha, Hanover, all of Fed. Rep. of Germany

[73] Assignee: Hermann Berstorff Maschinenbau GmbH, Fed. Rep. of Germany

[21] Appl. No.: 754,177

[22] Filed: Jul. 12, 1985

[30] Foreign Application Priority Data

Feb. 22, 1985 [DE] Fed. Rep. of Germany ....... 3506257

[51] Int. Cl.$^4$ ............................................. B29C 47/18
[52] U.S. Cl. ................................ 425/186; 425/192 R; 425/463
[58] Field of Search .................. 425/188, 131.1, 133.1, 425/133.5, 466, 467, 192 R, 462, 186, 463

[56] References Cited

U.S. PATENT DOCUMENTS

| 3,486,195 | 12/1969 | Greenwood | 425/377 |
| 3,902,835 | 9/1975 | Theysohn | 425/188 |
| 4,137,027 | 1/1979 | Rüger | 425/462 |
| 4,358,261 | 11/1982 | Ohki | 425/133.5 |

FOREIGN PATENT DOCUMENTS 2131734 6/1984 United Kingdom .

Primary Examiner—Willard E. Hoag
Attorney, Agent, or Firm—Schwartz, Jeffery, Schwaab, Mack, Blumenthal & Evans

[57] ABSTRACT

An extrusion head for producing, for example, tread strips for vehicle tires comprises a stationary central portion and two pivotable outer portions. Between each outer portion and the central portion, in the operative position of the head, insert members are interposed. Flow channels for the different materials used to make the tread strip and defined between the insert members and the central and outer portions of the head. The insert members are made displaceable by being detachably affixed to push-rods which are hydraulically, pneumatically or mechanically actuated. This provides for movement of the insert members, when the outer portions are pivoted away from the central portion, into a position which permits unhindered access to all sides of the insert members and permits the rapid cleaning and/or replacement thereof.

6 Claims, 3 Drawing Figures

EXTRUSION HEAD

FIELD OF THE INVENTION

The present invention relates to an extrusion head. More particular, the invention relates to an extrusion head of the type which comprises a fixed, central portion and two outer portions which are pivotable towards and away from the central portion.

BACKGROUND OF THE INVENTION AND PRIOR ART DISCUSSION

Extrusion heads of the general type referred to hereinbefore are known and are used for making products such as, for example, tread strips for tires for automotive vehicles. To produce tread strips, it is necessary for three or more different types of mixtures to be combined in the extruder head. This is because the strip comprises a tread surface portion formed from a highly wear-resistant material, lateral portions made of highly compressible material, a so-called lower or base portion which forms the bottom layer of the tread surface and is usually formed from a softer mixture than the tread surface, and a so-called pad mixture which ensures good adhesion of the strip to the carcase of the tire.

Accordingly, up to four mixtures, which have markedly different viscosities, must be brought together in a single extrusion head to form the tread strip profile. Moreover, the mixture must flow through the flow channels defined in the extrusion head at substantially identical flow rates.

In British Patent Specification No. 2 131 734 A, there is disclosed an extrusion head suitable for producing flat profiles from three different types of mixtures. Such a head is used in conjunction with a plurality of extruders, each extruder extruding a different material, which materials are to be combined into a single profile by the extrusion head. Such a head comprises a central portion which is fixedly connected to the extruder and respective upper and lower portions which are pivotable with respect to the central portion. Between these portions of the head, insert members are located. These insert members and appropriate surfaces of the central, upper and lower head portions define flow channels for the materials being extruded.

It is necessary for the head portions to be pivotable so that the insert members can be replaced or cleaned. This is necessary if the extrusion process is being modified so that a different rubber or elastomeric mixture is to be used in one or more of the extrusion devices.

In addition, it is necessary for the head portions to be pivotable away from one another so as to permit access to the screws of the various extrusion devices. This is because the screws require cleaning from time to time and, occasionally, require replacement.

Primarily, however, the head portions are made pivotable towards and away from one another to permit interchange or replacement of the insert members. This is necessary to provide different flow channels in the head and other templates may also be incorporated therein to achieve an optimum configuration for the flow channels. Moreover, by changing the insert members, different profiles are produced. In practice, this is effected relatively frequently because the extrusion apparatus may be required to produce tread strips for a wide range of tires such as different-sized tires for saloon cars, commercial vehicle tires and specialized tires for vehicles such as earth-moving machines.

It is therefore highly desirable that the insert members can be cleaned and/or interchanged very rapidly.

OBJECT OF THE INVENTION

The present invention seeks to provide a multi-part extrusion head in which the interchange of the insert members which define the flow channels can be effected very rapidly. The present invention also seeks to provide an extrusion head which permits the flow channels defined by the insert members to be cleaned rapidly.

SUMMARY OF THE INVENTION

According to the present invention, there is provided an extrusion head for producing profiles from a plurality of plastics material or rubber mixtures comprising feed means, said feed means comprising an extrusion device for each said mixture, head means receiving each said mixture from said feed means, said head means comprising a central stationary portion, first and second outer head portions disposed one on each side of said central portion, pivot mounting means for each of said first and second outer portions, said pivot mounting means permitting pivotal movement of each said outer portions into and out of an operative position relative to said central portion, insert member means interposed between each of said outer portions and said central portion in said operative position of said outer portions, each said insert member defining, with at least one of said central portion and said first and second outer members, flow channels for respective ones of said mixtures and means for displacing each said insert member in a direction generally away from said feed means when said outer portion adjacent thereto has been pivoted out of said operative position, said displacing means comprising a push-rod detachably affixed to said insert member and actuating means for displacing said push-rod, said actuating means causing displacement of said push-rod and said insert member affixed thereto between a first position in which there is free access to said flow channels and a second position in which said insert member is interposed between said respective one of said outer portion and said central portion.

In such an arrangement the insert members are displaceable, by means of the push-rods, into a position which permits free access to the flow channels. It is therefore possible for the insert members to be cleaned very rapidly to remove residual traces of the mixture or mixtures flowing therethrough. In such position, it is also simple to detach the insert members from the push rods, to remove them and replace them by identical or different insert members.

The insert members can, in consequence, be changed and/or cleaned within a few minutes, and this is highly advantageous. For example, a tread strip for a tire for a commercial vehicle only necessitates the production of a few meters of profile. Accordingly, to produce a variety of profiles for making the tread strips of numerous different vehicle tires, it must be possible to replace the insert members both frequently and rapidly.

In consequence, it may be necessary to interchange both the insert members and the premoulding template usually provided several times per hour of use of the apparatus.

Accordingly to advantageous embodiments of the invention, the push-rods to which the insert members are detachably affixed are formed by the piston rods of either hydraulic or pneumatic piston and cylinder arrangements.

Alternatively, the insert members may be detachably affixed to push rods in the form of toothed rods or racks, which rods or racks are driven by a pinion drive.

The insert members may be affixed to the push-rods by means of bayonet-type connectors, tommy screws or any other suitable detachable affixing means.

BRIEF DESCRIPTION OF THE DRAWINGS

Embodiments of the present invention will be further described, by way of example, with reference to the accompanying drawings, in which.

DESCRIPTION OF PREFERRED EMBODIMENTS

Figure 1:
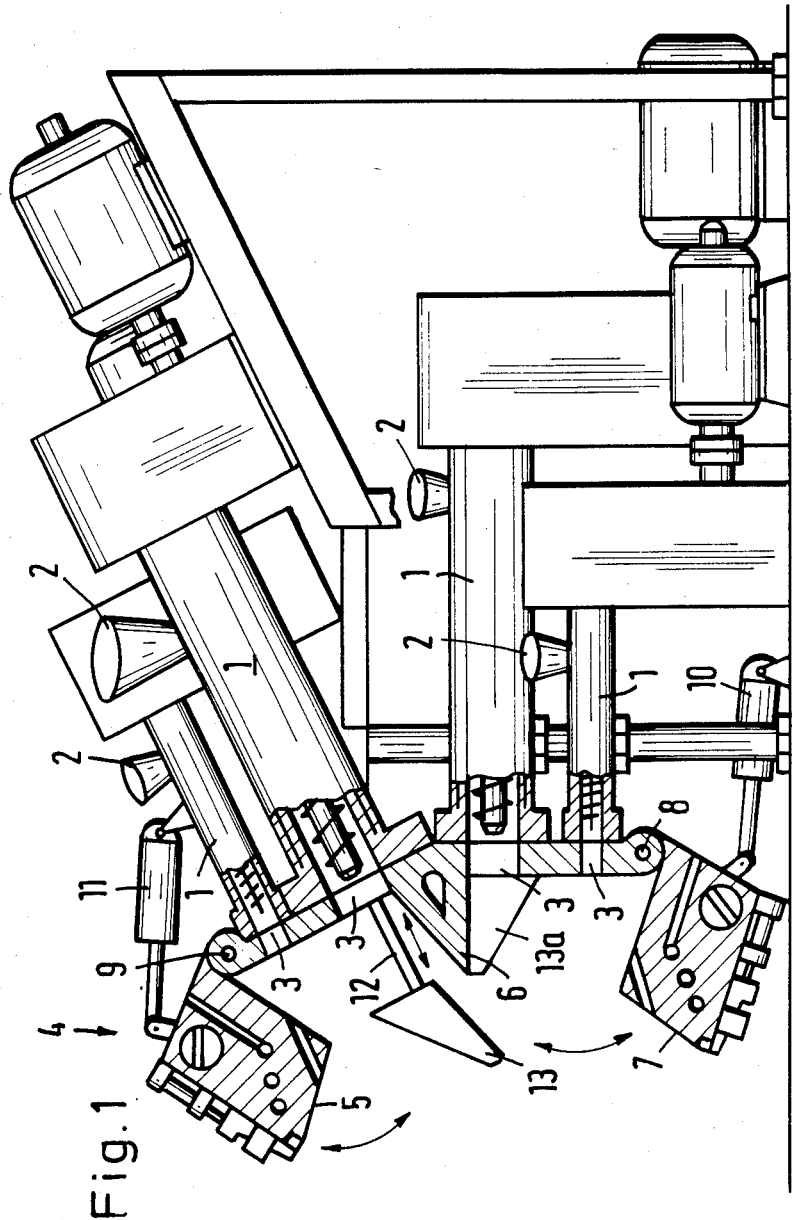
FIG. 1 is a schematic, longitudinal sectional view through an extruder arrangement suitable for producing tread strips for vehicle tires, the arrangement comprising four extrusion devices which extrude material into a common extrusion head, such head being shown in its open position.

A tread strip extrusion arrangement is shown in FIG. 1 and comprises four extrusion devices 1 which are each fed with a different rubber misture through respective feed hoppers 2. Each extrusion device comprises a hollow barrel 3 in which a screw (not referenced) rotates. From each of the hollow barrels 3, extruded material is fed into a common four-part extrusion head 4.

The major components of the extrusion head 4 are an upper portion 5, a stationary central portion 6 and lower portion 7. The upper portion 5 and the lower portion 7 are each pivotally mounted about pivot points 8 and 9 respectively. In FIG. 1, the portions 5 and 7 have each been pivoted away from the stationary central portion 6. To attain the working position of the head, these two portions 5 and 7 pivoted towards one another about their respective pivot points 8 and 9 respectively. The pivotal movement of the portions 5 and 7 is effected by means of hydraulic piston and cylinder arrangements 10 and 11 respectively. In such working position, the portions 5 and 7 are spaced form the central portion 6 by the interpositioning therebetween of insert members 13 and 13a respectively.

In FIG. 1, the insert member 13 is shown in an inoperative, extended position and the insert member is shown in its retracted working position. The extension and retraction of the insert members 13 and 13a is effected by means which will be described hereinafter. In such extended position, with the portions 5 and 7 in their open positions, there is unhindered access to the insert member 13. This member can thus be easily and rapidly cleaned and, if desired, be replaced by an identical insert member or by a different insert member having flow channels 14 and 15 which are dissimilar to those in the removed insert member.

Figure 2:
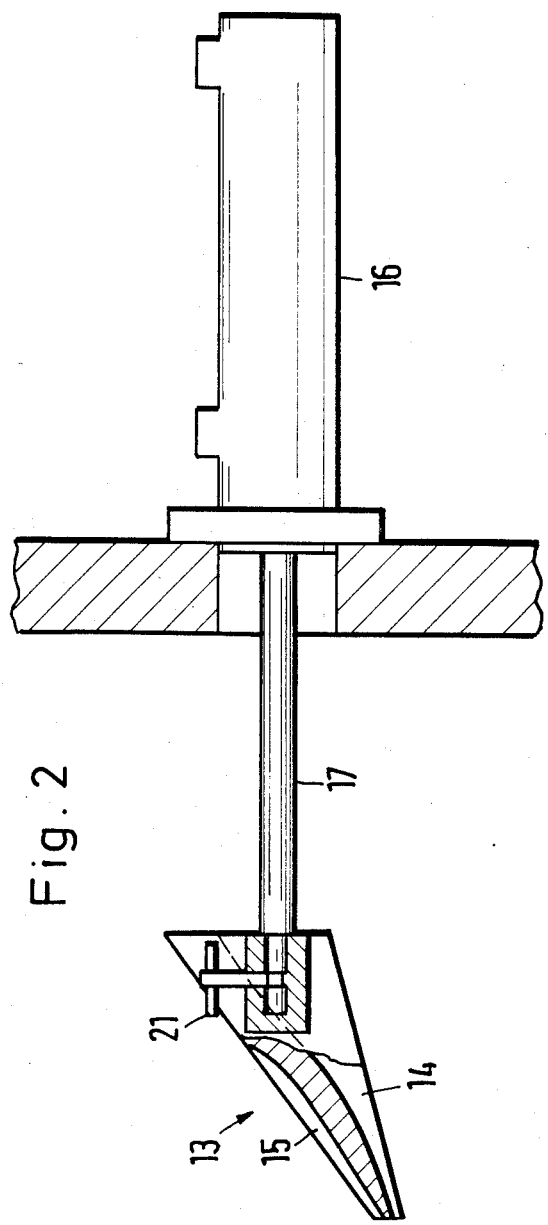
FIG. 2 shows, in greater detail and on an enlarged scale, an insert member forming part of the extruder head shown in FIG. 1.

In FIG. 2, insert member 13 is shown in greater detail. The member 13 is directly connected to the piston rod 17 of a hydraulic piston and cylinder arrangement 16 by means of a toggle screw.

Figure 3:
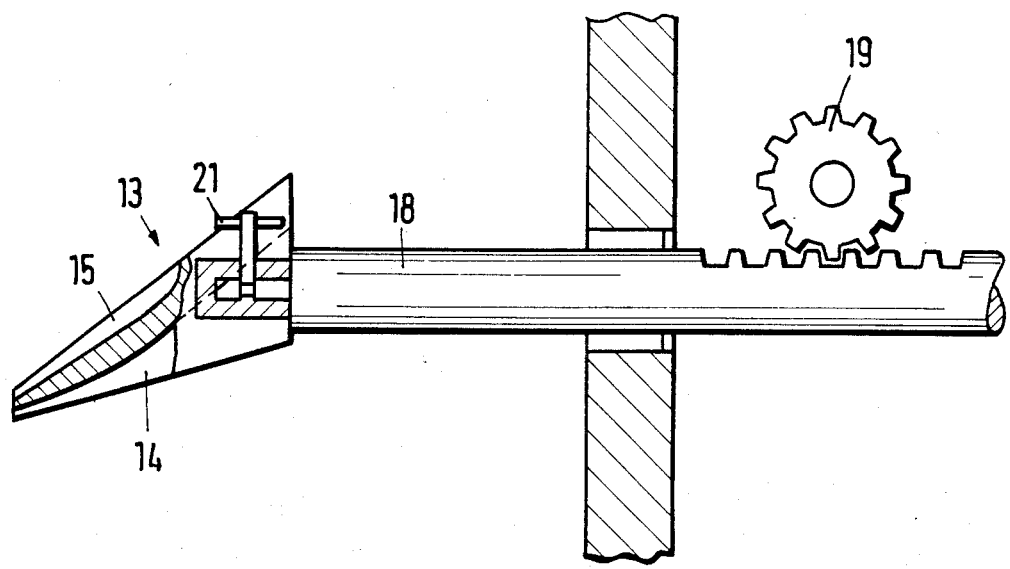
FIG. 3 is a view similar to FIG. 2 of an alternative embodiment of an insert member.

FIG. 3 illustrates an alternative arrangement in which a toothed rod or rack 18 is screw-threaded connected to the insert member 13. The rod or rack 18, together with the member 13, are extensible and retractable by utilizing a driven pinion 19 which engages with the toothed portion of the rack or rod 18.

I claim:

1. An extrusion head for producing profiles from a plurality of plastics material or rubber mixtures comprising feed means, said feed means comprising an extrusion device for each said mixture, head means receiving each said mixture from said feed means, said head means comprising a central stationary portion, first and second outer head portions disposed one on each side of said central portion, pivot mounting means for each of said first and second outer portions, said pivot mounting means permitting pivotal movement of each said outer portions into and out of an operative position relative to said central portion, insert member means interposed between each of said outer portions and said central portion in said operative position of said outer portions, each said insert member defining, with at least one of said central portion and said first and second outer members, flow channels for respective ones of said mixtures and means for displacing each said insert member in a direction generally away from said feed means when said outer portion adjacent thereto has been pivoted out of said operative position, said displacing means comprising a push-rod detachably affixed to said insert member and actuating means for displacing said push-rod, said actuating means causing displacement of said push-rod and said insert member affixed thereto between a first position in which there is free access to said flow channels and a second position in which said insert member is interposed between said respective one of said outer portion and said central portion.

2. An extrusion head as recited in claim 1, wherein said actuating means comprises a hydraulic piston and cylinder arrangement, said arrangement including a piston rod, said piston rod forming said push rod.

3. An extrusion head as recited in claim 1, wherein said actuating means comprises a pneumatic piston and cylinder arrangement, said arrangement including a piston rod, said piston rod forming said push rod.

4. An extrusion head as recited in claim 1, wherein said actuating means comprises a pinion drive and said push-rod comprises a toothed rod or rack, said pinion drive engaging with said toothed rod or rack.

5. An extrusion head as recited in claim 1, wherein said insert members are connected to said push-rods by bayonet-type connectors.

6. An extrusion head as recited in claim 1, wherein said insert members are connected to said push-rods by tommy screws.

* * * * *